United States Patent Office 3,728,320
Patented Apr. 17, 1973

3,728,320
POLYMERIC EPOXIDES
Edwin J. Vandenberg, Wilmington, Del., assignor to
Hercules Incorporated, Wilmington, Del.
No Drawing. Continuation-in-part of application Ser. No.
812,079, May 11, 1959, now Patent No. 3,135,705,
dated June 2, 1964, which is a continuation-in-part of
abandoned application Ser. No. 738,626, May 29, 1958.
This application June 30, 1960, Ser. No. 39,809
Int. Cl. C08f 7/12
U.S. Cl. 260—88.3 A                           13 Claims

ABSTRACT OF THE DISCLOSURE

High molecular weight, water-insoluble copolymers of propylene oxide and higher alkylene oxides with a monoepoxide of a diene or polyene and particularly with butadiene monoxide, vinyl cyclohexene monoxide, and 1,2-epoxy-5,9-cyclododecadiene are described.

---

This application is a continuation-in-part of my application Ser. No. 738,626, filed May 29, 1958 and now abandoned, and of my application Ser. No. 812,079, filed May 11, 1959 and issued as U.S. Pat. 3,135,705 on June 2, 1964, which is a continuation-in-part of my abandoned application Ser. No. 738,626, filed May 29, 1958.

This invention relates to new polymeric epoxides, and more particularly, to high molecular weight copolymers of propylene oxide and higher alkylene oxides with ethylenically unsaturated epoxides.

In accordance with this invention high molecular weight copolymers of alkylene oxides containing three or more carbon atoms with a monoepoxide of a diene have been discovered. These copolymers are unique in that they are essentially linear polyethers, copolymerization having taken place through the epoxy groups. These new polyethers are water-insoluble elastomeric polymers which, since they retain the ethylene double bonds in the ethylenically unsaturated portion of the polymer, may be vulcanized with standard sulfur recipes to produce excellent rubbers.

The new copolymers of this invention are those produced by the copolymerization of an alkylene oxide containing at least three carbon atoms with at least one other epoxide, at least one of which is a monoepoxide of a diene or polyene. The monoepoxides of dienes and polyenes that may be copolymerized with alkylene oxides containing at least three carbon atoms to produce these new copolymers have the general formula

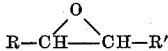

where R is an ethylenically unsaturated radical, as for example, ethylenically unsaturated aliphatic radicals, such as vinyl, propenyl, isopropenyl, allyl, methallyl, butenyl, oleyl, etc., and cycloalkyl or aryl radicals containing an ethylenically unsaturated substituent and cycloalkyl radicals containing an ethylenic double bond in the ring, as for example, 4-vinylcyclohexyl, α-terpinyl, γ-terpinyl, abietyl, cyclohexenylmethyl, o-allylphenyl, p-vinylbenzyl, etc., and R′ is hydrogen, R (as defined above) alkyl, cycloalkyl, aryl or alkaryl or R and R′ together with the two carbons of the epoxy group may form a cycloaliphatic ring, e.g.

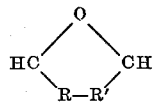

which may itself contain an ethylene double bond or which may be substituted by an ethylenically unsaturated hydrocarbon group such as a vinyl group. Exemplary of the monoepoxides of dienes and polyenes having the above general formula are butadiene monoxide, chloroprene monoxide, 3,4-epoxy-1-pentene, 4,5-epoxy-2-pentene, 4,5-epoxy-1-hexene, 5,6-epoxy-1-hexene, 5,6-epoxy-2-hexene, 3,4-epoxy-1-vinylcyclohexene, 1,2-epoxy-5,9-cyclododecadiene, divinylbenzene monoxide, 5,6-epoxy-1,7-octadiene, etc.

Any alkylene oxide containing at least three carbon atoms or mixtures thereof may be copolymerized with the ethylenically unsaturated epoxides to produce the new polymers of this invention. Exemplary of such alkylene oxides are propylene oxide, butene-1 oxide, cis and trans butene-2 oxides, hexene-1 oxide, hexene-2 oxide, dodecene-1 oxide, hexadecene-1 oxide, octadecene-1 oxide, etc. Mixtures of any of these alkylene oxides may be used so that the final polymer is a terpolymer, quaternary polymer, etc., or any other epoxide may be included to produce a terpolymer, quaternary polymer, etc. However, if ethylene oxide is included as the third monomer, the amount of ethylene oxide introduced into the polymer must be kept below about 10%, and preferably below about 5%, since above this amount the polymer becomes water sensitive and/or water soluble and, hence, is not useful for most rubber applications. The exact amount of ethylene oxide that may be incorporated will depend on the composition of the remainder of the polymer. Thus, for example, larger amounts of ethylene oxide may be incorporated in a copolymer of butene oxide and butadiene monoxide than in a copolymer of propylene oxide and butadiene monoxide.

The copolymers of this invention will then contain at least the following two repeating units:

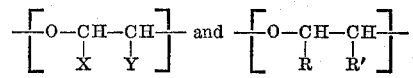

where X is H or alkyl, Y is alkyl and R and R′ are defined as set forth above, or R and R′ together with the carbons to which they are attached may be a cycloaliphatic nucleus which itself contains an ethylene double bond or is in turn substituted with a group R, e.g.

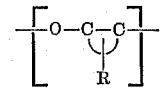

where R is again the ethylenically unsaturated radicals as defined above.

These copolymers contain from about 99% to about 50% of the alkylene oxide containing at least three carbon atoms and from about 1% to about 50% of the ethylenically unsaturated epoxide monomer, and preferably will contain from about 97% to about 70% of the said alkylene oxide and from about 3% to about 30% of the ethylenically unsaturated epoxide. The amount of the ethylenically unsaturated epoxide required will vary with the unsaturated epoxide, but will generally be that amount required to give good rubber, physical properties. As pointed out above, in the case of ethylene oxide incorporated as an additional epoxide no more than about 10% of ethylene oxide should be incorporated, since above this amount the copolymer will be either partially water soluble or excessively swollen by water.

The new copolymers of this invention are characterized as being elastomeric products which are capable of vulcanization to yield highly desirable rubbers. In the unvulcanized state they are elastomeric polymers which are generally snappy, tough rubbers. They are further characterized by being insoluble in water, but soluble in most organic solvents, and particularly in hydrocarbon solvents. These copolymers are high molecular weight, substantially linear polyethers which preferably have a reduced specific viscosity of at least about 2.0, and more preferably at least about 3.0 when measured as a 0.1% solution in benzene at 25° C. The copolymers of this invention, being organo soluble and hence not cross-linked, are easily processed and may then be compounded and vulcanized to produce excellent rubbers which are outstanding, particularly in low temperature properties and heat build-up. Although largely amorphous copolymers are preferred for best rubbery characteristics, some degree of crystallinity in the copolymer is somewhat advantageous in some cases. The amount of crystallinity should not exceed that amount which interferes seriously with the rubbery properties. In general, it should be below about 25% and preferably below about 15%. Higher crystallinity may appear on stretching and is desirable in many cases.

The new polyethers of this invention may be prepared by contacting a mixture of the alkylene oxide and the monoepoxide of the diene or polyene with an organoaluminum compound, preferably one which has been reacted with from 0.1 to 2 moles of a chelating agent such as acetylacetone, trifluoroacetylacetone, etc., and/or reacted with from about 0.1 to about 1.5 moles of water and preferably 0.5 to 1 mole of water per mole of the organoaluminum compound. Exemplary of the organoaluminum compounds that may be so reacted with a chelating agent and/or water and used as the catalyst are triethylaluminum, tripropylaluminum, triisobutylaluminum, trioctylaluminum, diethylaluminum hydride, diisobutylaluminum hydride, etc.

The polymerization reaction is generally carried out in the presence of an inert, liquid organic diluent but may be carried out in an essentially bulk polymerization process. Suitable diluents that may be used for the polymerization are the ethers such as diethyl ether, dipropyl ether, dibutyl ether, etc., halogenated hydrocarbons such as chlorobenzene, methylene chloride, etc., or preferably a hydrocarbon diluent such as propane, butane, pentanes, n-heptane, cyclohexane, benzene, toluene, etc., and mixtures of such diluents. The temperature of the polymerization process may be varied over a wide range generally from about −80° C. to about 250° C. and preferably from about −30° C. to about 150° C. and while atmospheric or autogenous pressure is usually used, the pressure may be varied from subatmospheric up to several atmospheres, if desired.

The following examples illustrate the preparation of new high molecular weight alkylene oxide copolymers in accordance with this invention. All parts and percentages are by weight unless otherwise indicated. The molecular weight of the polymers is shown by their reduced specific viscosity (RSV). By the term "reduced specific viscosity" is meant the $\eta_{sp.}/c$ determined on a 0.1% solution of the polymer in benzene containing 0.1 g. of the polymer per 100 ml. of solution, at 25° C. unless otherwise indicated. For the most accurate RSV determination, the catalyst should be removed and the polymer dried in the absence of air, for example, in an inert atmosphere such as nitrogen.

EXAMPLES 1–6

In each of these examples a polymerization vessel in which the air had been replaced with nitrogen was charged with the diluent (except in Examples 5 and 6 where the only diluent present was that added with the catalyst) which was either n-heptane or a mixture of ether and heptane, the alkylene oxide, and the monoepoxide of the polyene. After equilibrating at the reaction temperature, a solution of the catalyst was injected. The catalyst solution in each case was prepared by diluting a 25% solution of triethylaluminum in n-heptane to 0.5 molar with ether, reacting this solution with acetylacetone in the cited molar ratio, agitating the solution at 30° C. for 16 hours, and then adding 0.5 mole of water per mole of aluminum, and again agitating the solution at 30° C. for 16 hours. In Table I are set forth the monomers that were copolymerized, the amount of each, the diluent used, and the amount thereof, the catalyst and amount thereof expressed as parts of triethylaluminum, the reaction time and temperature, the percent conversion to isolated polymer obtained, and the RSV of each polymer as determined on a 0.1% solution in benzene at 25° C. The monomers copolymerized are indicated in the table by the following abbreviations:

PO=Propylene oxide
BMO=Butadiene monoxide
VCMO=Vinylcyclohexene monoxide (1,2-epoxy-4-vinylcyclohexane)
ECD=1,2-epoxy-5,9-cyclododecadiene The copolymers in Examples 1 and 2 were isolated by adding sufficient ether to make the solution of low viscosity for ease in handling, then washing the reaction mixture first with a 3% aqueous solution of hydrogen chloride, then with water until neutral, then with a 2% aqueous solution of sodium bicarbonate, and again with water. After adding an amount of Santonox, i.e. 4,4'-thiobis(6-tert-butyl-m-cresol), in methanol equal to 0.5% based on the polymer, to the reaction mixture, the ether was evaporated and the polymer was dried. A similar procedure was used for isolating the copolymers of Examples 3 and 4, except that the polymer was washed three times with 10% sodium hydroxide and then with water until neutral instead of with acid. In Examples 5 and 6 the polymerization was stopped by adding 4 parts of a 1 molar solution of ammonia in 95:5 ethanol-water, then heating the reaction mixture for 20 hours at 50° C. The copolymers were then isolated by adding 1% of phenyl-$\beta$-naphthylamine based on the polymer as an antioxidant and sufficient benzene to make the solution easily handled. The reaction mixture was then agitated for 16 hours at 30° C., and the solvents evaporated. The copolymers were then dried for 16 hours at 80° C. The copolymers produced in these examples were all largely amorphous, a number of them being completely amorphous as shown by X-ray diffraction.

TABLE I

| Example No. | Diluent Total parts | Diluent Components | Monomer | Parts | Catalyst [1] | Parts | Reaction conditions | Isolated polymer Percent conv. | RSV |
|---|---|---|---|---|---|---|---|---|---|
| 1 | 17.6 | 84% ether / 16% n-heptane | PO / BMO | 9 / 1 | $(C_2H_5)_2AlA \cdot 0.5H_2O$ | 0.74 | 8 hrs., 30° C. | 22 | 9.8 |
| 2 | 17.6 | 20% ether / 80% n-heptane | PO / VCMO | 9.4 / 0.6 | $(C_2H_5)_2AlA \cdot 0.5H_2O$ | 0.74 | 4 hrs., 30° C. | 11 | 12.5 |
| 3 | 29 | n-Heptane | PO / ECD | 8 / 2 | $(C_2H_5)_2AlA \cdot 0.5H_2O$ | 0.45 | 4 hrs., 30° C. | 16 | 7.8 |
| 4 | 65.2 | n-Heptane | PO / BMO | 9.5 / 0.5 | $(C_2H_5)_3Al \cdot 0.5A \cdot 0.5H_2O$ | 0.23 | 4.6 hrs., 50° C. | 47 | 15.3 |
| 5 | 5.6 | 70% ether / 30% n-heptane | PO / BMO | 8.5 / 1.5 | $(C_2H_5)_3Al \cdot 0.5A \cdot 0.5H_2O$ | 0.45 | 19 hrs., 30° C. | 98 | >5.8 |
| 6 | 5.6 | 70% ether / 30% n-heptane | PO / BMO | 8 / 2 | $(C_2H_5)_3Al \cdot 0.5A \cdot 0.5H_2O$ | 0.45 | 19 hrs., 30° C. | 95 | 6.4 |

A=Acetylacetone.

A description of the copolymers produced in Examples 1–6 is summarized in Table II along with the physical data on vulcanizates prepared from a number of them.

In these examples and the following examples the copolymers were vulcanized by compounding 100 parts of each copolymer on a two-roll mill with the specified vulcanization formula, and then press-curing at 310° F. for the specified time. The vulcanization formulas used, based on 100 parts of polymer, were

| Formula No. | I | II | III |
|---|---|---|---|
| High abrasion furnace black | 50 | ---- | 50 |
| Sulfur | 2 | 2 | 5 |
| Zinc oxide | 3 | 3 | 5 |
| Stearic acid | 2 | 2 | 2.5 |
| Tetramethylthiuram disulfide | ---- | 1.5 | ---- |
| Mercaptobenzothiazole | 1.5 | 1.5 | ---- |

The vulcanization mixtures of Examples 1–4 were press-cured at 310° F. for 40 minutes, and those of Examples 5 and 6 were press-cured at 310° F. for 60 minutes.

EXAMPLE 7

A polymerization vessel with a nitrogen atmosphere was charged with 65 parts of n-heptane, 9 parts of cis-butene-2 oxide and 1 part of vinyl cyclohexene monoxide (1-vinyl-3,4-epoxy-cyclohexane). The vessel and contents were cooled to −78° C. and 0.8 part of triisobutyl-aluminum in 3.3 parts of n-heptane was added. After 4 hours at −78° C., 4 parts of anhydrous ethanol was added and the copolymer was isolated by the same procedure as described for Examples 1 and 2. There was obtained a 77% conversion to a snappy rubber having an RSV greater than 3.4 as measured on a 0.1% solution in benzene at 25° C. A bromine number analysis indicated that the copolymer contained 10% of the vinyl cyclohexene monoxide. This copolymer was vulcanized using the vulcanization Formula I and press-cured at 310° F. for 40 minutes. The vulcanizate had the physical properties typical of a cross-linked elastomer.

EXAMPLE 8

Example 7 was repeated except that in place of the 9 parts of cis-butene-2 oxide, there was used 4.5 parts of cis-butene-2 oxide and 4.5 parts of trans-butene-2 oxide. There was obtained a snappy rubber in a conversion of 53% which had an RSV greater than 2.1 as measured on a 0.1% solution in benene at 25° C. Bromine number analysis indicated that it contained 15% vinyl cyclohexene monoxide. It was vulcanized with vulcanization Formula I and press-cured at 310° F. for 40 minutes. The vulcanizate had the physical properties typical of a cross-linked elastomer.

What I claim and desire to protect by Letters Patent is:

1. As a new composition of matter, a water-insoluble copolymer consisting of from about 50% to about 99% by weight of one or more alkylene oxides containing from 3 to 18 carbon atoms wherein the epoxy group is an oxirane ring and from about 1% to about 50% by weight of one or more monoepoxides of hydrocarbons containing at least 2 ethylenic double bonds, said monoepoxides containing from 4 to 42 carbon atoms, and said copolymer having a reduced specific viscosity of at least about 2.0 measured on a 0.1% solution in benzene at 25° C. and resulting from reaction through the epoxy group of said alkylene oxides and said monoepoxides.

2. The composition of claim 1 wherein said monoepoxides have the formula

where R is an ethylenically unsaturated hydrocarbon group containing from 2 to 20 carbon atoms.

3. The composition of claim 2 wherein said monoepoxides are monoepoxides of dienes.

4. The composition of claim 3 wherein one of the alkylene oxides is propylene oxide.

5. The composition of claim 3 wherein one of the alkylene oxides is a butene oxide.

6. A water-insoluble copolymer consisting of propylene oxide and butadiene monoxide, said copolymer containing from about 50% to about 99% by weight of said propylene oxide, having a reduced specific viscosity of at least about 2.0 as measured on a 0.1% solution in benzene at 25° C. and resulting from reaction through the epoxy group of said propylene oxide and said butadiene monoxide, the epoxy group of said propylene oxide being an oxirane ring.

7. A water-insoluble copolymer consisting of propylene oxide and vinyl cyclohexene monoxide, said copolymer containing from about 50% to about 99% by weight of said propylene oxide, having a reduced specific viscosity of at least about 2.0 as measured on a 0.1% solution in benzene at 25° C. and resulting from reaction through the epoxy group of said propylene oxide and said vinyl cyclohexene monoxide, the epoxy group of said propylene oxide being an oxirane ring.

8. A water-insoluble copolymer consisting of propylene oxide and 1,2-epoxy-5,9-cyclododecadiene, said copolymer containing from about 50% to about 99% by weight of said propylene oxide, having a reduced specific viscosity of at least about 2.0 as measured on a 0.1% solution in benzene at 25° C. and resulting from reaction through the epoxy group of said propylene oxide and said 1,2-epoxy-5,9-cyclododecadiene, The epoxy group of said propylene oxide being an oxirane ring.

9. A water-insoluble copolymer consisting of cis-butene-2 oxide and vinyl cyclohexene monoxide, said copolymer containing from about 50% to about 99% by weight of said cis-butene-2 oxide, having a reduced specific viscosity of at least about 2.0 as measured on a 0.1% solution in benzene at 25° C. and resulting from reaction through the epoxy group of said cis-butene-2 oxide and said vinyl cyclohexene monoxide.

TABLE II

| Example number | Copolymer composition, percent by weight | Description | Water solubility | Vulcanization formula | Tensile strength p.s.i. | Modulus 300%, p.s.i. | Ultimate Elongation, percent | Shore hardness A2 | Resilience, percent | Break set, percent | Heat build-up | Percent gel formation | Percent swell (toluene) |
|---|---|---|---|---|---|---|---|---|---|---|---|---|---|
| 1 | PO:BMO 80:20 | Snappy rubber | Insoluble | I | 1,690 | 1,340 | 410 | 81 | ---- | ---- | ---- | ---- | ---- |
| 2 | PO:VCMO 99:1 | Tough, snappy rubber | do | II | ---- | ---- | ---- | ---- | ---- | ---- | ---- | 86 | 1,920 |
| 3 | PO:ECD 91:9 | Snappy rubber | do | III | ---- | ---- | ---- | ---- | ---- | ---- | ---- | 98 | 500 |
| 4 | PO:BMO 95:5 | ---- | do | I | 1,840 | 1,020 | 580 | 64 | ---- | ---- | ---- | ---- | ---- |
| 5 | PO:BMO 85:15 | ---- | do | I | 2,200 | 940 | 680 | 65 | 36 | 70 | 35 | ---- | ---- |
| 6 | PO:BMO 80:20 | ---- | do | I | 1,900 | 920 | 570 | 59 | 36 | 45 | 22 | ---- | ---- |

10. A water-insoluble copolymer consisting of cis-butene-2 oxide, trans-butene-2 oxide and vinyl cyclohexene monoxide, said copolymer having a reduced specific viscosity of at least about 2.0 as measured on a 0.1% solution in benzene at 25° C., resulting from reaction through the epoxy group of said cis-butene-2 oxide, said trans-butene-2 oxide and said vinyl cyclohexene monoxide and containing from about 50% to about 99% by weight of the cis-butene-2 oxide and trans-butene-2 oxide.

11. A solid copolymer which results from the reaction of an admixture containing a lower 1,2-alkylene oxide and butadiene monoxide, said reaction being effected through the epoxy group of said lower 1,2-alkylene oxide and said butadiene monoxide, wherein said lower 1,2-alkylene oxide is propylene oxide.

12. The composition of claim 1 wherein the polyether is a copolymer of said alkylene oxide and a monoepoxide of a cycloaliphatic hydrocarbon containing at least two ethylene double bonds.

13. The composition of claim 12 wherein the polyether is a copolymer of propylene oxide and a monoepoxide of a cyclic diene.

No references cited.

HARRY WONG, JR., Primary Examiner

U.S. Cl. X.R.

260—29.6 R, 41 C, 45.9 R, 79.5 C, 80.3 R